(12) United States Patent
Omori

(10) Patent No.: US 8,827,634 B2  
(45) Date of Patent: Sep. 9, 2014

(54) GEAR-DRIVEN TURBO COMPRESSOR

(75) Inventor: Naomichi Omori, Tokyo (JP)

(73) Assignee: IHI Corporation, Tokyo (JP)

( * ) Notice: Subject to any disclaimer, the term of this patent is extended or adjusted under 35 U.S.C. 154(b) by 581 days.

(21) Appl. No.: 13/202,506

(22) PCT Filed: Feb. 2, 2010

(86) PCT No.: PCT/JP2010/051387  
§ 371 (c)(1),  
(2), (4) Date: Aug. 19, 2011

(87) PCT Pub. No.: WO2010/095507  
PCT Pub. Date: Aug. 26, 2010

(65) Prior Publication Data  
US 2011/0305558 A1  Dec. 15, 2011

(30) Foreign Application Priority Data  
Feb. 19, 2009  (JP) ................. 2009-036659

(51) Int. Cl.
| | |
|---|---|
| F01D 15/12 | (2006.01) |
| F04D 29/10 | (2006.01) |
| F16C 17/02 | (2006.01) |
| F04D 25/16 | (2006.01) |
| F04D 29/057 | (2006.01) |
| F16C 33/74 | (2006.01) |
| F04D 29/063 | (2006.01) |
| F04D 17/12 | (2006.01) |
| F16C 32/06 | (2006.01) |

(52) U.S. Cl.  
CPC ............ F04D 25/163 (2013.01); F04D 29/102 (2013.01); F16C 17/024 (2013.01); F04D 29/057 (2013.01); F16C 32/0614 (2013.01); F16C 33/74 (2013.01); F16C 2360/24 (2013.01); F04D 29/063 (2013.01); F04D 17/12 (2013.01)  
USPC .................... 415/122.1; 415/124.1

(58) Field of Classification Search  
USPC ................. 415/122.1, 124.1, 124.2  
See application file for complete search history.

(56) References Cited

U.S. PATENT DOCUMENTS

| | | | |
|---|---|---|---|
| 6,450,688 B2 | 9/2002 | Matsushima | |
| 6,524,081 B2 * | 2/2003 | Wu | ................. 417/362 |

(Continued)

FOREIGN PATENT DOCUMENTS

| | | |
|---|---|---|
| JP | 7208456 | 8/1995 |
| JP | 8189494 | 7/1996 |

(Continued)

OTHER PUBLICATIONS

Bruckner, R.J., et al., "Compliant Foil Journal Bearing Performance at Alternate Pressures and Temperatures", NASA/TM, 2008-215219, GT2008-50174, May 2008.

(Continued)

Primary Examiner — Dwayne J White  
(74) Attorney, Agent, or Firm — Griffin & Szipl, P.C.

(57) ABSTRACT

Provided is a gear-driven turbo compressor capable of increasing a natural frequency of a shaft by shortening the length of an overhang from a radial bearing to a shaft end, reducing an effort of replacing lubricant and an environmental burden by greatly reducing the amount of the lubricant, and reducing the necessity for maintenance by reducing a problem of the radial bearing caused by depleted materials of the lubricant. The gear-driven turbo compressor includes: a gas bearing 32 which is in communication with a compressed gas compressed by an impeller 16 and rotatably supports both ends of a pinion shaft 13; and an inner gas seal 34 which is positioned between the gas bearing and a thrust collar, maintains the gas bearing to be compressed by the compressed gas, and prevents intrusion of lubricant for gears due to the compressed gas.

5 Claims, 6 Drawing Sheets

(56) References Cited

U.S. PATENT DOCUMENTS

| | | | |
|---|---|---|---|
| 7,654,251 B2 * | 2/2010 | Jones et al. | 123/559.1 |
| 7,854,587 B2 | 12/2010 | Ito et al. | |
| 2001/0028752 A1 | 10/2001 | Matsushima | |
| 2002/0069858 A1 * | 6/2002 | Wheeler et al. | 123/559.1 |
| 2007/0147988 A1 | 6/2007 | Ito et al. | |

FOREIGN PATENT DOCUMENTS

| | | |
|---|---|---|
| JP | 8232885 | 9/1996 |
| JP | 2001263291 | 9/2001 |
| JP | 2001295836 | 10/2001 |
| JP | 2003065286 | 3/2003 |
| JP | 2004044954 | 2/2004 |
| JP | 2004190783 | 7/2004 |
| JP | 2004263781 | 9/2004 |
| JP | 2007177887 | 7/2007 |
| JP | 2008232289 | 10/2008 |
| JP | 20008231933 | 10/2008 |
| JP | 2009299748 | 12/2009 |

OTHER PUBLICATIONS

International Search Report in priority International Patent Application No. PCT/JP/2010/051387, completed on Apr. 1, 2010 and mailed on Apr. 13, 2010.

* cited by examiner

GEAR-DRIVEN TURBO COMPRESSOR

This is a National Phase Application in the United States of International Patent Application No. PCT/JP2010/051387 filed Feb. 2, 2010, which claims priority on Japanese Patent Application No. 036659/2009, filed Feb. 19, 2009. The entire disclosures of the above patent applications are hereby incorporated by reference.

BACKGROUND OF THE INVENTION

1. Technical Field of the Invention

The present invention relates to a gear-driven turbo compressor which increases a speed by a speed-up gear to rotationally drive a turbo compressor at a high speed.

2. Description of the Related Art

Turbo compressors may be largely classified into a "direct connection type" directly connecting an impeller of a turbo compressor to a rotation shaft of a motor and a "speed-up gear type" increasing a speed of a rotation of a motor, an engine, a turbine, or the like by a speed-up gear to rotationally drive an impeller of a turbo compressor at a high speed. Hereinafter, the speed-up gear type turbo compressor will be referred to as a "gear-driven turbo compressor".

The gear-driven turbo compressor has the features that a multi-stage turbo compressor with three or more stages may be driven by a single drive source (a motor or the like), large capacity may be easily obtained compared to the direct connection type turbo compressor, reliability, compression efficiency, and mechanical efficiency are high, and maintenance is easy.

The direct connection type turbo compressor is disclosed in, for example, Patent Documents 1 to 5, and the gear-driven turbo compressor is disclosed in, for example, Patent Documents 6 and 7.

Furthermore, a "foil bearing" according to the invention is disclosed in, for example, Patent Documents 8 to 10 and Non-Patent Document 1, and a "dry seal" is disclosed in, for example, Patent Documents 11 and 12.

FIG. 1 is a partially cross-sectional view illustrating an existing gear-driven turbo compressor.

In this example, the gear-driven turbo compressor is a four-stage compressor, and is configured to obtain a high pressure gas by sequentially compressing an object gas by four impellers 16 (only two of them are shown in the drawing). Further, in this drawing, a compressor housing surrounding the impeller and a gas flow path are not shown.

In FIG. 1, the reference numeral 12 indicates a bull gear (a large gear), the reference numeral 14 indicates a pinion gear (a small gear), the bull gear 12 is rotationally driven by a driving device (a motor, an engine, a turbine, or the like) (not shown), and the speed of the pinion gear 14 is increased by the rotation, so that the impellers 16 attached to both ends thereof rotate at a high speed. The speed increasing ratio of the speed-up gear including the bull gear 12 and the pinion gear 14 is generally ten times or so, and each impeller rotates at high speed at about ten thousand rpm to several tens of thousands of rpm.

In FIG. 1, the reference numeral 18 indicates a thrust collar which is fixed to a pinion shaft 13 (a small gear shaft) with the pinion gear 14 interposed therebetween, and the reference numeral 20 indicates a thrust bearing which supports a thrust force of a large gear shaft 11. The thrust force acting on each impeller and the thrust force generated by the meshing portion between the bull gear and the pinion gear are transferred to the thrust bearing 20 via the thrust collar 18 and the bull gear 12 slidably supported therebetween.

Further, in this drawing, the reference numeral 15 indicates a gear box (a casing), the reference numeral 22 indicates a radial bearing, the reference numeral 23 indicates a gas seal, and the reference numeral 24 indicates an oil thrower (an oil seal).

[Patent Document 1] Japanese Patent Application Laid-Open No. 2003-65286, "OIL-FREE COMPRESSOR"
[Patent Document 2] Japanese Patent Application Laid-Open No. 2004-44954, "TURBO REFRIGERATING MACHINE HAVING COMPRESSOR WITH GAS BEARING AND ITS OPERATING METHOD"
[Patent Document 3] Japanese Patent Application Laid-Open No. 2008-232289, "BEARING DEVICE AND ROTATION DRIVING DEVICE HAVING THE SAME"
[Patent Document 4] Japanese Patent Application Laid-Open No. 07-208456, "CENTRIFUGAL COMPRESSOR"
[Patent Document 5] Japanese Patent Application Laid-Open No. 08-232885, "BEARING GAS SUPPLY DEVICE"
[Patent Document 6] Japanese Patent Application Laid-Open No. 08-189494, "GEAR DRIVEN MULTI-SHAFT TURBO COMPRESSOR AND GEAR DRIVEN MULTI-SHAFT RADIAL EXPANDER"
[Patent Document 7] Japanese Patent Application Laid-Open No. 2008-231933, "GEAR DRIVEN TURBO COMPRESSOR"
[Patent Document 8] Japanese Patent Application Laid-Open No. 2001-295836, "FOIL TYPE FLUID BEARING"
[Patent Document 9] Japanese Patent Application Laid-Open No. 2004-263781, "FOIL BEARING AND METHOD OF USING THE SAME"
[Patent Document 10] Japanese Patent Application Laid-Open No. 2009-299748, "FOIL BEARING"
[Patent Document 11] Japanese Patent Application Laid-Open No. 2004-190783, "METHOD OF ACTIVATING DRY GAS SEAL TYPE ROTARY MACHINE AND DRY GAS SEAL TYPE ROTARY MACHINE"
[Patent Document 12] Japanese Patent Application Laid-Open No. 2007-177887, "CENTRIFUGAL COMPRESSOR AND DRY GAS SEAL SYSTEM USED THEREIN"
[Non-Patent Document 1] Robert J. Bruckner and Bernadette J. Puleo, "Compliant Foil Journal Bearing Performance at Alternate Pressures and Temperature", NASA/TM, 2008-215219, GT2008-50174, May 2008

SUMMARY OF THE INVENTION

As shown in FIG. 1, the existing gear-driven turbo compressor has a structure in which the bull gear 12 (the large gear) is rotated by power of the motor, and the power is transferred to the pinion shaft 13 (the small gear shaft) by the pinion gear 14 (the small gear) disposed at the outer periphery of the bull gear to increase the speed. Here, the impeller 16 (the vaned disc) is provided at the end of the pinion shaft 13 to compress a gas fluid. For this reason, a large radial load (radial force) acts on the pinion shaft 13 by the gear driving force.

The pinion shaft 13 is supported by the oil lubrication type radial bearing 22 capable of withstanding the radial load caused by the gear driving force and the high speed rotation (several tens of thousands of rpm), and the thrust force generated when compressing the gas is transferred to the bull gear 12 via the thrust collar 18 provided in the pinion shaft 13.

Furthermore, the pinion shaft 13 is provided with the oil thrower 24 isolating the oil of the radial bearing 22 or the gas seal 23 (a labyrinth seal, a dry gas seal, or the like) sealing the compressed gas fluid.

As described above, in the gear-driven turbo compressor, since a large radial force acts on the pinion shaft due to the gear driving force, the oil lubrication type radial bearing is applied to the pinion shaft unlike the direct connection type turbo compressor.

That is, the gas bearing has a small load capability compared to the oil lubrication type radial bearing, and may not support the gear driving force (the radial load) acting on the pinion shaft of the gear-driven turbo compressor. For this reason, in the past, the gas bearing was not applied to the gear-driven turbo compressor.

However, the existing gear-driven turbo compressor has the following problems due to the oil lubrication type radial bearing 22 supporting the pinion shaft 13.

(1) The radial bearing 22 is of an oil lubrication type, and this bearing needs as much lubricant as an amount lubricating the gears (the bull gear 12 and the pinion gear 14). For this reason, it takes an effort to replace lubricant and an environmental load is large.

(2) Depleted materials of lubricant are gathered in the radial bearing 22. For this reason, since a problem causing abnormal vibration may be generated, maintenance needs to be periodically performed.

(3) Since the oil thrower 24 needs to be provided between the radial bearing 22 and the impeller 16 if necessary, the axial length becomes longer. The oil thrower 24 may have a configuration in which a convex portion is provided on the surface of the pinion shaft 13 and an uneven portion capable of covering the convex portion is provided at the stationary side (the casing), and has a function of separating lubricant of the surface of the pinion shaft 13 by a centrifugal force.

(4) Furthermore, the gas seal 23 needs to be provided at the outside of the bearing and oil thrower (the impeller assembly) so that lubricant is not mixed with the compressed gas, and the overhang (the length from the radial bearing to the shaft end) becomes longer. For this reason, a critical speed is reduced, and it is difficult to design the shaft.

The invention is made to solve the above-described problems. That is, an object of the invention is to provide a gear-driven turbo compressor capable of increasing a natural frequency of a shaft by shortening the length of an overhang from a radial bearing to a shaft end, easily avoiding a critical speed, further increasing the operational rpm, reducing an effort of replacing lubricant and an environmental burden by greatly reducing the amount of the lubricant, and reducing the necessity for maintenance by reducing a problem of the radial bearing caused by depleted materials of the lubricant.

According to the invention, provided is a gear-driven turbo compressor including: a bull gear which is rotationally driven about the axis center of a large gear shaft by an external driving device; a pinion gear which meshes with the bull gear and rotates at high speed about the axis center of a pinion shaft; an impeller which is fixed to the end of the pinion shaft and rotates at high speed about the axis center thereof; a thrust collar which is fixed to the pinion shaft, slidably supports a side surface of the bull gear, and transfers a thrust force of the pinion shaft to the bull gear; a thrust bearing which supports a thrust force acting on the large gear shaft; a gas bearing which is in communication with a compressed gas compressed by the impeller and rotatably supports both ends of the pinion shaft; and an inner gas seal which is positioned between the gas bearing and the thrust collar, maintains the gas bearing to be compressed by the compressed gas, and prevents intrusion of lubricant for gears due to the compressed gas.

According to the preferred embodiment of the invention, the gas bearing is in direct communication with the compressed gas via a rear surface of the impeller.

Further, the gas bearing is a foil bearing which is in communication with the gas compressed by the impeller, and the inner gas seal is a dry gas seal which includes a sliding plate axially pressed against an end surface of the thrust collar.

Furthermore, the gear-driven turbo compressor further includes an outer gas seal which is positioned between the gas bearing and the impeller; and a compressed gas supply line which supplies a compressed gas to a middle position between the outer gas seal and the inner gas seal.

The outer gas seal includes a seal portion which is used for a sealing operation for preventing the compressed gas from leaking from the gas bearing side to the impeller side when the pressure of the gas bearing side is higher than the pressure of the impeller side, and opens the seal portion when the pressure of the impeller side is higher than the pressure of the gas bearing side.

According to the above-described configuration of the invention, the gas bearing rotatably supporting both ends of the pinion shaft is in communication with the compressed gas compressed by the impeller, and maintains the gas bearing to be compressed by the compressed gas by using the inner gas seal. Therefore, the load capability of the gas bearing may be remarkably improved in accordance with the pressure (for example, 0.1 MPa or higher) of the compressed gas, so that even the gas bearing may support the gear driving force (the radial load) acting on the pinion shaft of the gear-driven turbo compressor.

Furthermore, since the gas bearing has a small loss compared to the oil lubrication type bearing, the efficiency may be improved and the energy consumption may be reduced.

Furthermore, since the inner gas seal positioned between the gas bearing and the thrust collar prevents the intrusion of the lubricant for the gears by using the compressed gas supplied from the gas bearing side, the lubricant may be reliably prevented from being mixed with the compressed gas while maintaining the gas bearing to be compressed.

Furthermore, since the gas bearing is in communication with the compressed gas compressed by the impeller and is maintained to be dried, an oil thrower or an oil seal preventing the intrusion of the lubricant is not needed between the gas bearing and the impeller, and the length of an overhang from the radial bearing to the shaft end may be shortened, thereby increasing the natural frequency of the shaft, increasing the speed, and widening the operation area.

Furthermore, since the radial bearing is the gas bearing and does not need lubricant, the amount of lubricant largely reduces (reduces almost by half), whereby the effort of replacing the lubricant and the environmental burden may be reduced.

Furthermore, since the oil lubricating system (the oil tank, the pump, the filter, and the like) is decreased in size and the axial length becomes shortened, the installation space becomes smaller. Furthermore, the manufacturing cost may be reduced.

Furthermore, in the past, lubricant having low viscosity was used to match the radial bearing. However, lubricant having high viscosity exclusively used for gears may be used, and the durability of the gear may be improved.

Furthermore, since the radial bearing is the gas bearing and does not use lubricant, the problem of the radial bearing caused by the depleted materials of lubricant may be reduced and hence the necessity for maintenance may be reduced.

DESCRIPTION OF THE PREFERRED EMBODIMENT

Figure 1:
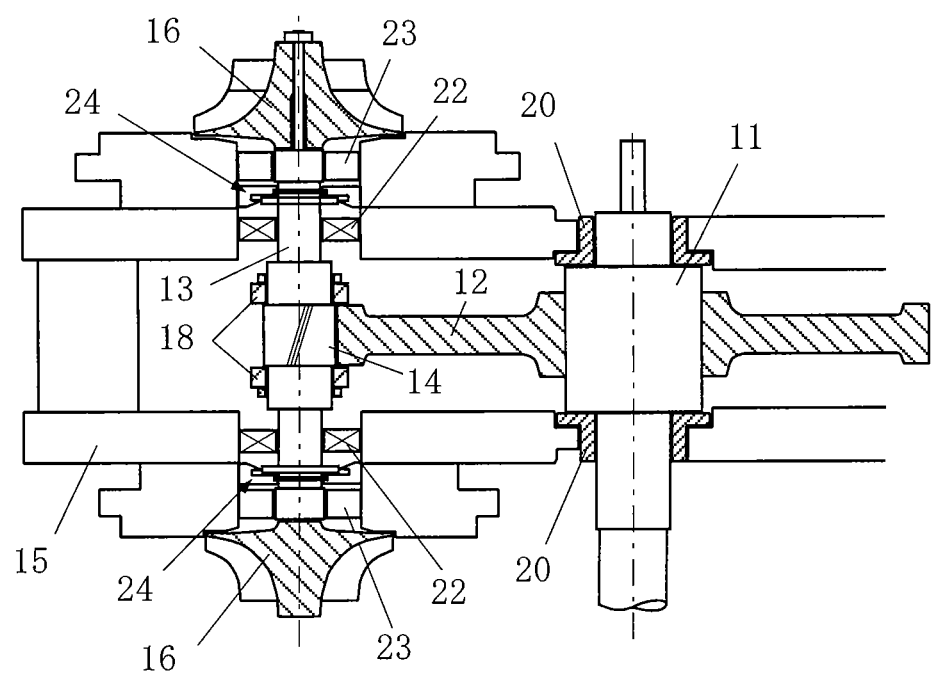
FIG. 1 is a partially cross-sectional view illustrating an existing gear-driven turbo compressor.

Hereinafter, preferred embodiments of the invention will be described by referring to the accompanying drawings. Furthermore, the same reference numerals will be given to the same components in the respective drawings and the repetitive description thereof will be omitted.

Figure 2:
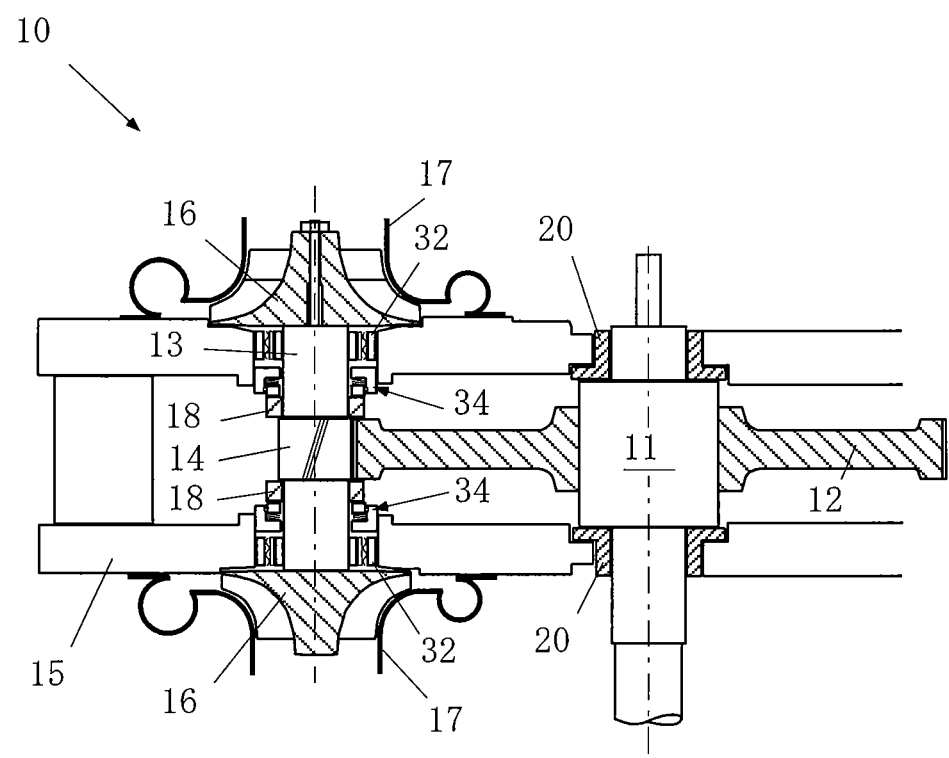
FIG. 2 is a partially cross-sectional view illustrating a gear-driven turbo compressor of a first embodiment of the invention.
Figure 3:
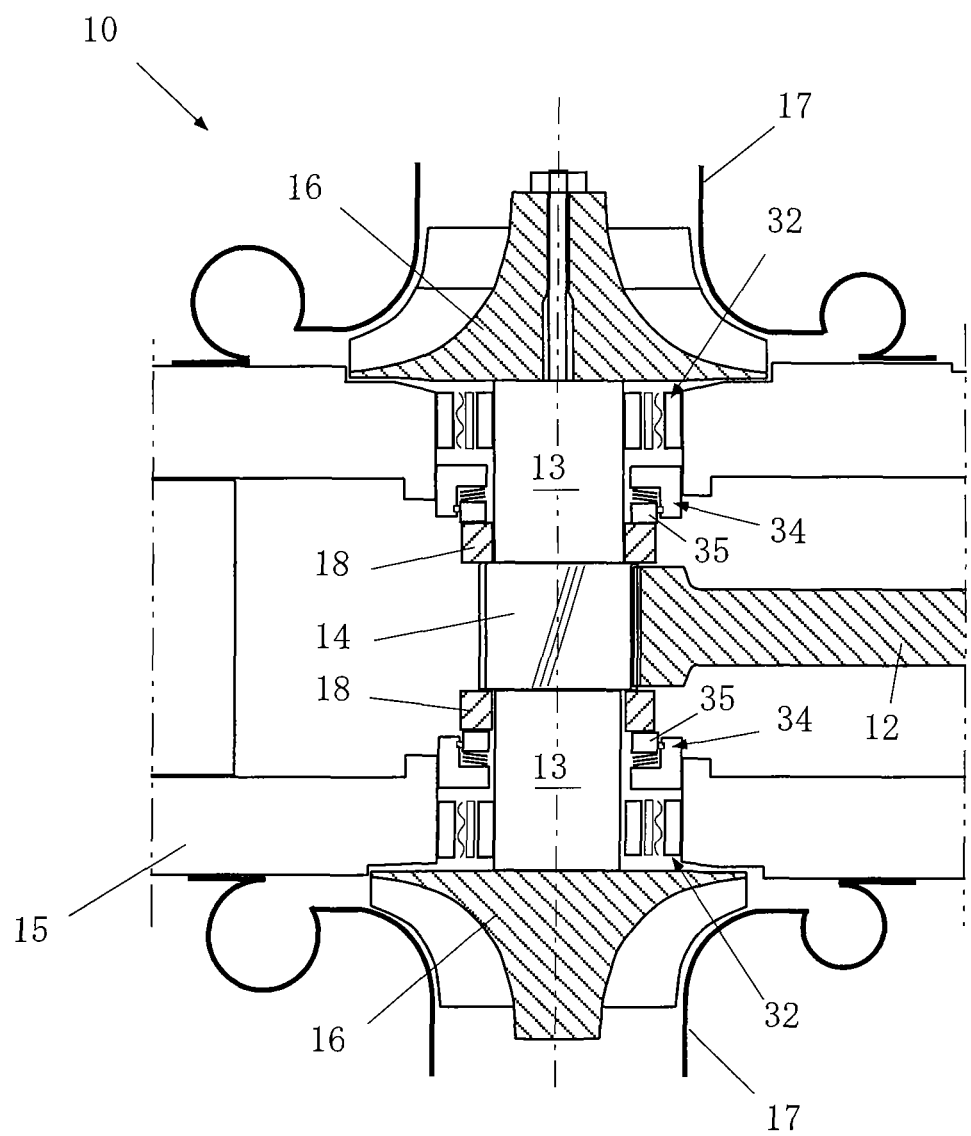
FIG. 3 is a partially enlarged view of FIG. 2.

FIG. 2 is a partially cross-sectional view illustrating a gear-driven turbo compressor of a first embodiment of the invention. Furthermore, FIG. 3 is a partially enlarged view of FIG. 2.

In FIG. 2, a gear-driven turbo compressor 10 of the invention includes a bull gear 12 (a large gear), a pinion gear 14 (a small gear), an impeller 16 (a vaned disc), a thrust collar 18, and a thrust bearing 20.

In the drawing, the gear-driven turbo compressor 10 of the invention is a four-stage compressor, but the invention is not limited thereto. That is, a one-stage compressor or a two-stage, three-stage, or five-stage or more compressors may be adopted.

The bull gear 12 is rotationally driven about the axis center of a large gear shaft 11 by an external driving device (a motor, an engine, a turbine, or the like) (not shown). It is desirable that the bull gear 12 is a spur gear, a helical gear, or a double helical gear of which the number of teeth is ten times more than that of the pinion gear 14 in order to increase the speed of the pinion gear 14, but the invention is not limited thereto. That is, the type of the gear may be arbitrarily set as long as the gear has a speed increasing function.

The pinion gear 14 meshes with the bull gear 12 and rotates at high speed about the axis center of a pinion shaft 13 (a small gear shaft). Only one pinion gear 14 is shown at the left side of the drawing, but it is desirable to provide another pinion gear at the right side of the drawing in the case of the four-stage compressor.

Lubricant is supplied from a lubricant supply device (not shown) to the meshing portion between the bull gear 12 and the pinion gear 14. The lubricant is gathered at a bottom portion of a gear box 15 (a casing) and is re-circulated.

The impeller 16 is fixed to the pinion shaft 13 and rotates at high speed about the axis center thereof. In this example, the impeller 16 is provided at both ends of the pinion shaft 13, but may be provided only at one end thereof. Furthermore, in this drawing, the reference numeral 17 indicates a compressor housing surrounding the impeller, and a gas flow path is not shown.

Furthermore, it is desirable that the gas compressed by the impeller 16 is air, nitrogen, or inert gas, but oxygen, hydrogen, or the like may be used.

The thrust collar 18 is fixed around the pinion shaft 13 to slidably support the side surface of the bull gear 12 and transfer the thrust force of the pinion shaft 13 to the bull gear 12. In this example, two thrust collars 18 sandwich the tooth portion of the bull gear 12 in the axial direction, but when the impeller 16 is provided only at one end of the pinion shaft 13, the thrust force may be received by one thrust collar 18.

The gap between the thrust collar 18 and the tooth portion of the bull gear 12 is set to a gap (for example, 0.1 to 0.2 mm) which is sufficiently small so that they may slide on each other with low resistance by oil lubrication.

The thrust bearing 20 supports the thrust force acting on the large gear shaft 11. In this example, the thrust bearing 20 is adapted to also support the radial force acting on the large gear shaft 11, but the invention is not limited thereto.

In FIG. 2, the gear-driven turbo compressor 10 of the invention further includes a gas bearing 32 and an inner gas seal 34.

The gas bearing 32 is in communication with the compressed gas compressed by the impeller 16, and rotatably supports both ends of the pinion shaft 13. Hereinafter, the "compressed gas" indicates, for example, a high pressure gas of 0.1 MPa or higher and desirably 0.1 to 7 MPa, and a "high pressure gas space" indicates a space filled with the compressed gas.

In this example, the gas bearing 32 is disposed to directly communicate with the compressed gas compressed by the impeller 16 via the rear surface of the impeller 16. Here, the "direct communication" indicates that a member (an oil seal or a labyrinth seal) generating a pressure loss is not present between the rear surface of the impeller 16 and the gas bearing 32 and the compressed gas at the rear surface of the impeller 16 reaches the gas bearing 32 via a flow path generating a small pressure loss.

Furthermore, in this example, the gas bearing 32 is a dynamic pressure type gas bearing of which load capacity of the gas bearing becomes larger in accordance with the pressure (for example, 0.1 MPa or higher) of the compressed gas, and is more desirably a foil bearing (a foil type gas bearing).

Figure 6:
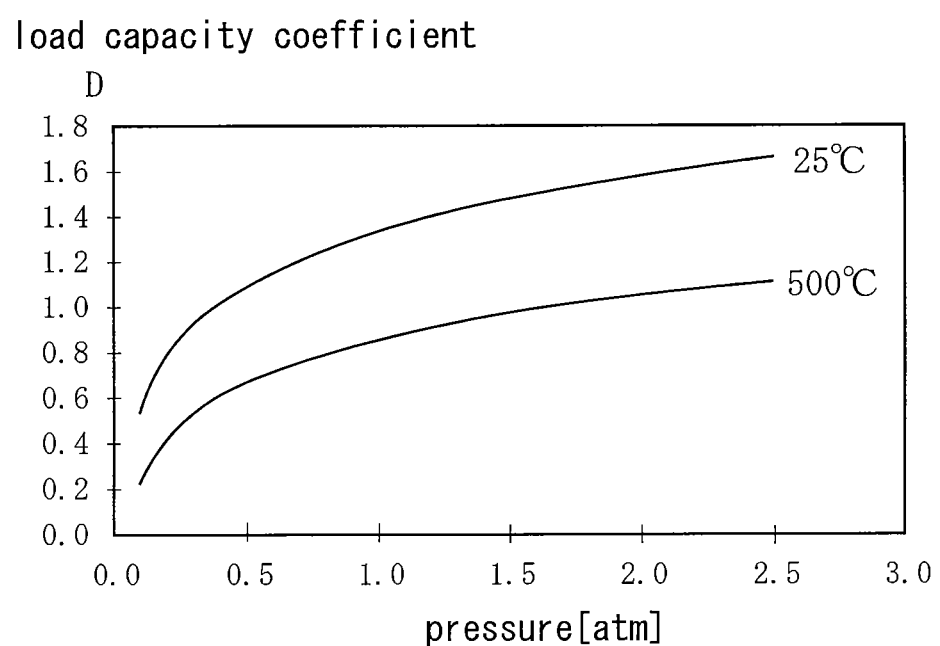
FIG. 6 is a diagram illustrating a correlation between a pressure and a load capacity coefficient of a foil bearing.

FIG. 6 is a diagram illustrating a correlation between a pressure and a load capacity coefficient of the foil bearing disclosed in Non-Patent Document 1.

In this drawing, the horizontal axis indicates the pressure (atm), the vertical axis indicates the load capacity coefficient D, and two curves in the drawing indicate the test results at 25° C. and 500° C.

Furthermore, the load capability W (the load capacity) of the foil bearing is expressed by the following equation (1).

$$W = D(L \times d)(d \times N) \tag{1}$$

Here, D indicates the above-described load capacity coefficient, L indicates the length of the bearing, d indicates the inner diameter of the bearing, and N indicates the rotation speed.

FIG. 6 and the equation (1) show that the load capability of the foil type gas bearing improves in the compression space. Furthermore, the pressure of FIG. 6 is about 2.5 atm at maximum, but this relationship may be applied to, for example, a compressed gas of 0.1 MPa or higher.

As is apparent from the equation (1), the load capacity coefficient D is a proportional coefficient obtained upon calculating the load capability W when the foil type gas bearing having the inner diameter d and the length L of the bearing is used at the rpm N, whereby it is understood that the load capacity coefficient D is proportional to the load capability W.

Accordingly, FIG. 6 may be understood to show that the load capability increases in accordance with an increase in the pressure.

The inner gas seal 34 is positioned between the gas bearing 32 and the thrust collar 18, and prevents the intrusion of lubricant for the gears by using the compressed gas. Furthermore, the inner gas seal 34 seals the leakage of the compressed gas from the compression space where the gas bearing 32 is positioned, and maintains the gas bearing 32 to be compressed by the compressed gas.

In this example, the inner gas seal 34 is a dry gas seal which has a sliding plate 35 axially pressed against the end surface of the thrust collar 18. Since the sliding plate 35 is pressed against the end surface of the thrust collar 18, a rotation seal plate necessary for a general dry gas seal may be omitted, and the axial length of the inner gas seal 34 may be reduced by half.

Furthermore, any gas seal may be used as the inner gas seal 34 instead of the dry gas seal as long as the gas bearing 32 may be maintained to be compressed by the compressed gas.

As shown in FIGS. 2 and 3, in the invention, the foil type gas bearing 32 is used as the radial bearing due to its excellent load capability, and the foil type gas bearing 32 is placed in a high pressure gas space in a manner such that the dry gas seal 34 is made to approach the thrust collar.

With the above-described configuration of the first embodiment, the gas bearing 32 may be maintained to be compressed by the compressed gas during the rotation of the impeller 16.

Hereinafter, an operation of the gear-driven turbo compressor 10 of the invention will be described.

As described above, since the gas bearing 32 (particularly, the foil type gas bearing) is placed in the high pressure gas space compressed by the compressed gas, the gas bearing has remarkably improved load capability and may support various radial loads (the actual weight of the pinion shaft, the power of the gear, the unbalancing force, and the like).

On the other hand, the thrust force generated when the impeller 16 compresses a gas is transferred to the thrust collar 18 provided in the pinion shaft 13. Since the gears 12 and 14 are lubricated by oil, an oil coating is formed between the thrust collar 18 and the bull gear 12 (the large gear), and the force transferred to the thrust collar 18 acts on the bull gear 12 with the oil coating interposed therebetween.

When the impeller 16 is provided at both ends of the pinion shaft 13, the thrust forces acting on the bull gear 12 almost cancel each other, and the remaining thrust force is supported by the (oil lubrication type) thrust bearing 20 provided in the bull gear 12.

That is, in the invention, the thrust force acting on the pinion shaft 13 is supported by the (oil lubrication type) thrust bearing 20 for the bull gear 12 via the thrust collar 18. Accordingly, the bearing of the invention is of a hybrid type adopting both the gas bearing and the oil lubrication type thrust bearing.

Furthermore, the inner gas seal 34 serves not only to seal the high pressure gas, but also to prevent the oil from the gears 12 and 14 from intruding into the installation space of the gas bearing 32. Although the gas compressed by the impeller 16 slightly leaks from the inner gas seal 34 via the gas bearing, the leaking gas may contribute to an operation of cooling the gas bearing which needs to be cooled.

Figure 4:
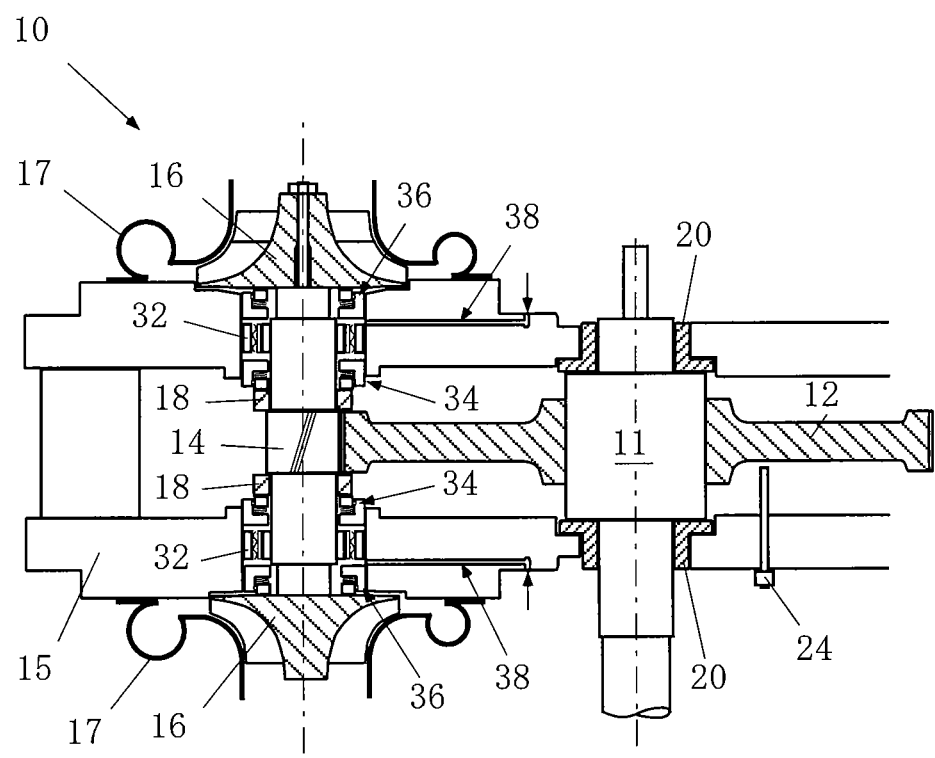
FIG. 4 is a partially cross-sectional view illustrating a gear-driven turbo compressor of a second embodiment of the invention.
Figure 5:
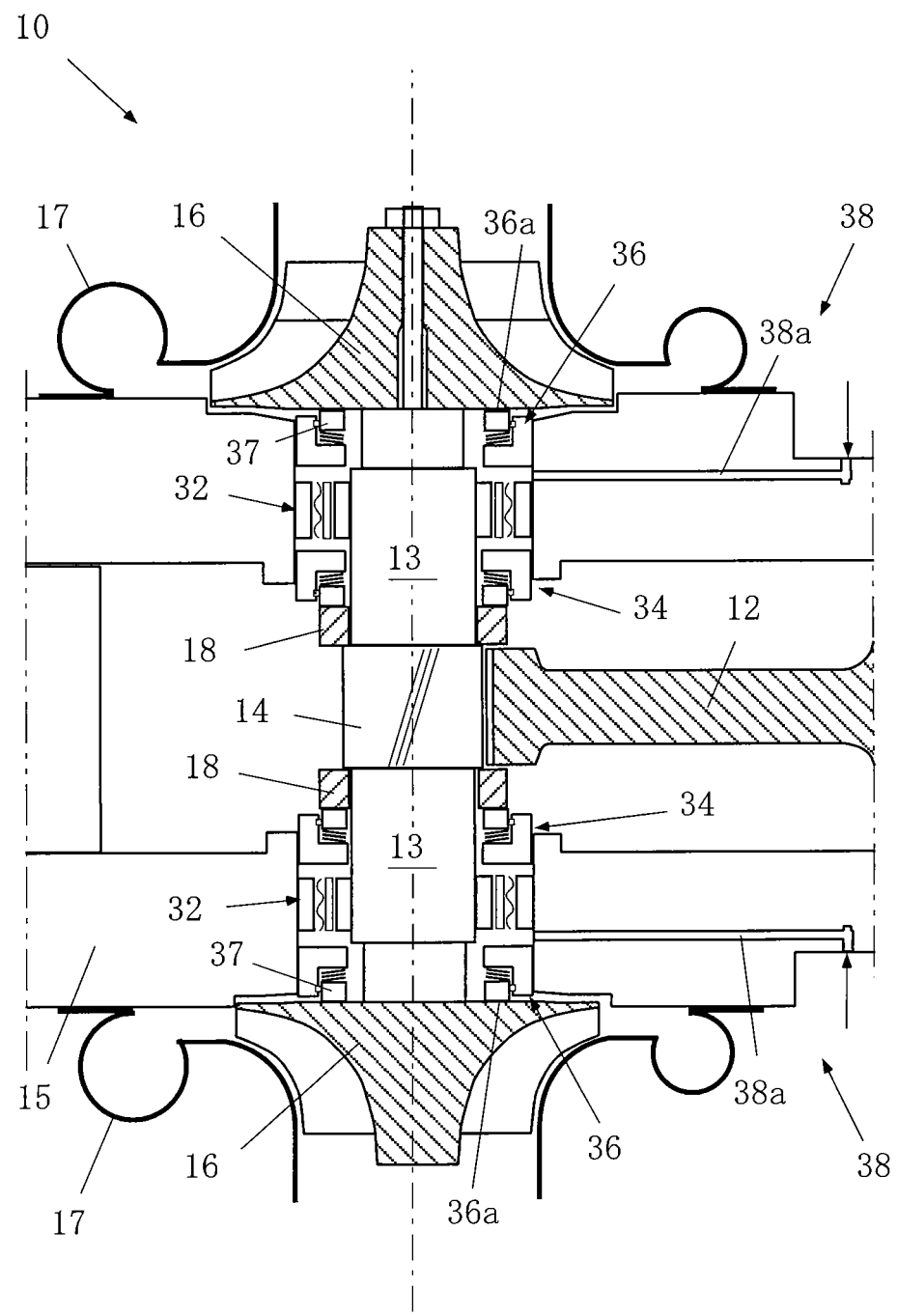
FIG. 5 is a partially enlarged view of FIG. 4.

FIG. 4 is a partially cross-sectional view illustrating a gear-driven turbo compressor of a second embodiment of the invention. Furthermore, FIG. 5 is a partially enlarged view of FIG. 4.

In this example, the gear-driven turbo compressor 10 of the invention further includes an outer gas seal 36 and a compressed gas supply line 38.

The outer gas seal 36 is positioned between the gas bearing 32 and the impeller 16, and is used for a sealing operation preventing the high pressure gas of the installation space of the gas bearing 32 from leaking to the impeller 16 when the rotation of the impeller 16 stops and is used to maintain the gas bearing 32 to be compressed by the compressed gas.

Furthermore, the outer gas seal 36 includes a seal portion 36a which is used for a sealing operation for preventing the compressed gas from leaking from the gas bearing side to the impeller side when the pressure of the gas bearing side is higher than the pressure of the impeller side. Furthermore, the outer gas seal 36 also serves as a check valve, and opens the seal portion 36a to directly communicate with the compressed gas compressed by the impeller 16 via the rear surface of the impeller 16 when the impeller 16 rotates so that the pressure of the impeller side becomes higher than the pressure of the gas bearing side.

In this example, the outer gas seal 36 is a dry gas seal which has a sliding plate 37 axially pressed against the end surface of the impeller 16. Since the sliding plate 37 is pressed against the end surface of the impeller 16, a rotation seal plate necessary for a general dry gas seal may be omitted, and the axial length of the outer gas seal 36 may be reduced by half.

Further, the outer gas seal 36 is not limited to this example, and any gas seal may be used as the outer gas seal instead of the dry gas seal as long as the gas bearing may be maintained to be compressed by the compressed gas and may be used as the above-described check valve.

The compressed gas supply line 38 includes a flow path 38a provided in the gear box 15 (the casing) and a gas pipe (not shown) communicating therewith, and supplies the compressed gas to the middle position between the outer gas seal 36 and the inner gas seal 34.

Furthermore, a valve (for example, a check valve or an open/close valve) (not shown) is desirably provided in the compressed gas supply line 38 so that the pressure at the gas bearing side does not flow reversely.

The compressed gas supply line 38 is in communication with an external pressure source (not shown), and is configured to supply a high pressure gas from the external pressure source to the installation space of the gas bearing 32 when the bearing load capability is not sufficient at the time of the activation. Furthermore, in this case, when a gas compressed during the activation is accumulated in, for example, a reservoir tank, the reservoir tank may be used instead of the external pressure source.

The pressure of the compressed gas supplied from the compressed gas supply line 38 is set to be lower than the pressure of the gas compressed by the impeller 16 in a steady state as long as the bearing load capability necessary for the activation is obtained.

Furthermore, the seal portion of the outer gas seal 36 is opened with an increase in the pressure of the gas compressed by the impeller 16, the high pressure gas compressed by the impeller 16 flows into the position of the gas bearing via the outer gas seal 36, and the gas bearing 32 is maintained to be compressed by the compressed gas.

The other configurations are the same as those of the first embodiment.

With the above-described configuration of the second embodiment, the gas bearing may be maintained to be compressed by the compressed gas when the impeller 16 does not rotate or rotates.

According to the above-described configuration, the gas bearing 32 rotatably supporting both ends of the pinion shaft 13 is in communication with the compressed gas compressed by the impeller 16, and maintains the gas bearing 32 to be compressed by the compressed gas by using the inner gas seal 34. Therefore, the load capability of the gas bearing 32 may be remarkably improved in accordance with the pressure (for example, 0.1 MPa or higher) of the compressed gas, so that even the gas bearing 32 may support the gear driving force (the radial load) acting on the pinion shaft 13 of the gear-driven turbo compressor.

Furthermore, since the gas bearing 32 has a small loss compared to the oil lubrication type bearing, the efficiency may be improved and the energy consumption may be reduced.

Furthermore, since the inner gas seal 34 positioned between the gas bearing 32 and the thrust collar 18 prevents the intrusion of the lubricant for the gears by using the compressed gas supplied from the gas bearing, the lubricant may be reliably prevented from being mixed with the compressed gas while maintaining the gas bearing 32 to be compressed.

Furthermore, since the gas bearing 32 is in communication with the compressed gas compressed by the impeller 16 and is maintained to be dried, an oil thrower or an oil seal preventing the intrusion of the lubricant is not needed between the gas bearing 32 and the impeller 16, and the length of an overhang from the radial bearing to the shaft end may be shortened, thereby increasing the natural frequency of the shaft, increasing the speed, and widening the operation area.

Furthermore, since the radial bearing is the gas bearing 32 and does not need lubricant, the amount of lubricant is greatly reduced (reduced almost by half), whereby the effort of replacing the lubricant and the environmental burden may be reduced.

Furthermore, since the oil lubricating system (the oil tank, the pump, the filter, and the like) decreases in size and the axial length becomes shortened, the installation space becomes smaller. Furthermore, the manufacturing cost may be reduced.

Furthermore, in the past, lubricant having low viscosity was used to match the radial bearing. However, lubricant having high viscosity exclusively used for gears may be used, and the durability of the gear may be improved.

Furthermore, since the radial bearing is the gas bearing and does not use lubricant, the problem of the radial bearing caused by the depleted materials of lubricant may be reduced and hence the necessity for maintenance may be reduced.

Furthermore, the invention is not limited to the above-described embodiments, but may be, of course, modified into various forms within the scope of the concept of the invention.

DESCRIPTION OF REFERENCE NUMERALS

10: GEAR-DRIVEN TURBO COMPRESSOR
11: LARGE GEAR SHAFT
12: BULL GEAR (LARGE GEAR)
13: PINION SHAFT (SMALL GEAR SHAFT)
14: PINION GEAR (SMALL GEAR)
15: GEAR BOX (CASING)
16: IMPELLER (VANED DISC)
17: COMPRESSOR HOUSING
18: THRUST COLLAR
20: THRUST BEARING
22: RADIAL BEARING
23: GAS SEAL
24: OIL THROWER (OIL SEAL)
32: GAS BEARING (FOIL TYPE GAS BEARING)
34: INNER GAS SEAL (DRY GAS SEAL)
35: SLIDING PLATE
36: OUTER GAS SEAL (DRY GAS SEAL)
36a: SEAL PORTION
37: SLIDING PLATE
38: COMPRESSED GAS SUPPLY LINE

The invention claimed is:

1. A gear-driven turbo compressor comprising:
a bull gear which is rotationally driven about the axis center of a large gear shaft by an external driving device;
a pinion gear which meshes with the bull gear and rotates at high speed about the axis center of a pinion shaft;
an impeller which is fixed to the end of the pinion shaft and rotates at high speed about the axis center thereof;
a thrust collar which is fixed to the pinion shaft, slidably supports a side surface of the bull gear, and transfers a thrust force of the pinion shaft to the bull gear;
a thrust bearing which supports a thrust force acting on the large gear shaft;
a gas bearing which is in communication with a compressed gas compressed by the impeller and rotatably supports both ends of the pinion shaft; and
an inner gas seal which is positioned between the gas bearing and the thrust collar, maintains the gas bearing to be compressed by the compressed gas, and prevents intrusion of lubricant for gears due to the compressed gas.

2. The gear-driven turbo compressor according to claim 1, wherein the gas bearing is in direct communication with the compressed gas via a rear surface of the impeller.

3. The gear-driven turbo compressor according to claim 1, wherein the gas bearing is a foil bearing, and
wherein the inner gas seal is a dry gas seal which includes a sliding plate axially pressed against an end surface of the thrust collar.

4. The gear-driven turbo compressor according to claim 1, further comprising:
an outer gas seal which is positioned between the gas bearing and the impeller; and
a compressed gas supply line which supplies a compressed gas to a middle position between the outer gas seal and the inner gas seal.

5. The gear-driven turbo compressor according to claim 4, wherein the outer gas seal includes a seal portion which is used for a sealing operation for preventing the compressed gas from leaking from the gas bearing to the impeller when the pressure of the gas bearing is higher than the pressure of the impeller, and opens the seal portion when the pressure of the impeller is higher than the pressure of the gas bearing.

* * * * *